United States Patent
George et al.

(10) Patent No.: US 8,776,974 B2
(45) Date of Patent: Jul. 15, 2014

(54) VEHICLE STARTING DEVICE

(71) Applicant: Schaeffler Technologies AG & Co. KG, Herzogenaurach (DE)

(72) Inventors: Philip George, Wooster, OH (US); Jeffrey Hemphill, Copley, OH (US); Mark Robert Milliren, Barberton, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 47 days.

(21) Appl. No.: 13/650,639

(22) Filed: Oct. 12, 2012

(65) Prior Publication Data

US 2013/0098729 A1     Apr. 25, 2013

Related U.S. Application Data

(60) Provisional application No. 61/549,080, filed on Oct. 19, 2011.

(51) Int. Cl.
| F02N 11/00 | (2006.01) |
| F02N 15/02 | (2006.01) |
| F16D 41/20 | (2006.01) |

(52) U.S. Cl.
USPC ..... 192/42; 192/41 S; 192/81 C; 123/179.25; 74/7 C

(58) Field of Classification Search
USPC ........................................ 192/81 C, 42, 41 S
See application file for complete search history.

(56) References Cited

U.S. PATENT DOCUMENTS

| 3,250,265 | A | * | 5/1966 | Barr ......................... 123/185.14 |
| 5,966,985 | A | * | 10/1999 | Shuto et al. ..................... 74/7 C |
| 7,472,672 | B2 | | 1/2009 | Asada et al. |
| 7,559,303 | B2 | | 7/2009 | Sakai et al. |
| 7,900,529 | B2 | | 3/2011 | Suzuki et al. |
| 2005/0051127 | A1 | | 3/2005 | Adam et al. |
| 2005/0230212 | A1 | * | 10/2005 | Kossett ............................ 192/35 |
| 2008/0163843 | A1 | | 7/2008 | Sakai et al. |
| 2010/0082218 | A1 | | 4/2010 | Layer |
| 2011/0168118 | A1 | * | 7/2011 | Li et al. ..................... 123/179.25 |
| 2012/0234281 | A1 | * | 9/2012 | Steele et al. ............. 123/179.25 |

FOREIGN PATENT DOCUMENTS

WO     2010130058     11/2010

OTHER PUBLICATIONS

International Search Report for PCT/US2012/059517, mailed Mar. 25, 2013 by Korean Intellectual Property Office.

* cited by examiner

*Primary Examiner* — Richard M. Lorence
*Assistant Examiner* — Lillian Nguyen
(74) *Attorney, Agent, or Firm* — Kevin L. Parks; Kathryn A. Warner

(57) ABSTRACT

A starting device for a vehicle includes a spring support ring and a coiled clutch. The coiled clutch has a first end frictionally engaged with the spring support ring, a center portion connected to the first end and arranged for compressive engagement with an outer shell of a torque converter, and a second end connected to the center portion and arranged for rotational displacement in a first direction relative to the first end to compressively engage the center portion with the outer shell. In some example embodiments, the spring support ring encircles the coiled clutch. In some example embodiments, the spring support ring includes a circumferential groove for receiving the first end. In an example embodiment, a free diameter of the first end is greater than a free diameter of the center portion.

17 Claims, 8 Drawing Sheets

VEHICLE STARTING DEVICE

FIELD

The invention relates generally to a starting device for a vehicle, and more specifically to a vehicle starting device including a coiled clutch.

BACKGROUND

Startup devices with one-way clutches are known. Examples are shown in U.S. Pat. No. 7,559,303 to Sakai et al., U.S. Pat. No. 7,472,672 to Asada et al., and U.S. Pat. No. 7,900,529 to Suzuki et al.

BRIEF SUMMARY

Example aspects broadly comprise a starting device for a vehicle including a spring support ring and a coiled clutch. The coiled clutch has a first end frictionally engaged with the spring support ring, a center portion connected to the first end and arranged for compressive engagement with an outer shell of a torque converter, and a second end connected to the center portion and arranged for rotational displacement in a first direction relative to the first end to compressively engage the center portion with the outer shell. In some example embodiments, the spring support ring encircles the coiled clutch. In some example embodiments, the spring support ring includes a circumferential groove for receiving the first end. In an example embodiment, a free diameter of the first end is greater than a free diameter of the center portion.

In an example embodiment, the spring support ring is integral with a transmission bellhousing for the vehicle. In an example embodiment, the spring support ring is press fitted into a transmission bellhousing for the vehicle. In an example embodiment, the starting device includes a centering plate arranged for fixing between an engine and a transmission, and the spring support ring is fixed to the centering plate. In some example embodiments, the starting device has a centering plate fixed to the spring support ring and a gear support plate drivingly engaged with the clutch second end and rotatably connected to the centering plate. In an example embodiment, the starting device includes a ring gear fixed to the gear support plate.

In some example embodiments, the starting device includes a return clutch drivingly engaged with the second end and arranged to displace the second end in a second direction, opposite the first direction, relative to the first end, to release the clutch center portion from the shell. In some example embodiments, the return clutch has a coiled return spring and a friction clutch. In an example embodiment, the friction clutch has a load tube circumscribing the return spring, at least one friction washer, and a resilient element urging the load tube against the friction washer. In an example embodiment, the return clutch is drivingly engaged with a starter motor for the vehicle.

Other example aspects broadly comprise a starting device for a vehicle including a centering plate, a spring support ring fixed to the centering plate, and a gear support plate rotatable relative to the centering plate and arranged for fixing to a torque converter. The starting device also includes a ring gear fixed to the ring support plate and a wrap spring clutch. The wrap spring clutch has a first end frictionally engaged with the spring support ring, a second end fixed to the gear support plate, and a center portion arranged for compressive engagement with the torque converter. In an example embodiment, the spring support ring is fixedly attached to an engine or a transmission of the vehicle.

In an example embodiment, the starting device has a starter motor fixed to the spring support ring. The starter motor has a gear drivingly engaged with the ring gear. In an example embodiment, the starting device has a return clutch. The return clutch has a housing, a drive hub, a load tube, and a torsion spring. The drive hub is arranged for driving connection with the starter motor. The load tube is frictionally engaged with the housing. The torsion spring has a first end connected to the drive hub and a second end connected to the load tube.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
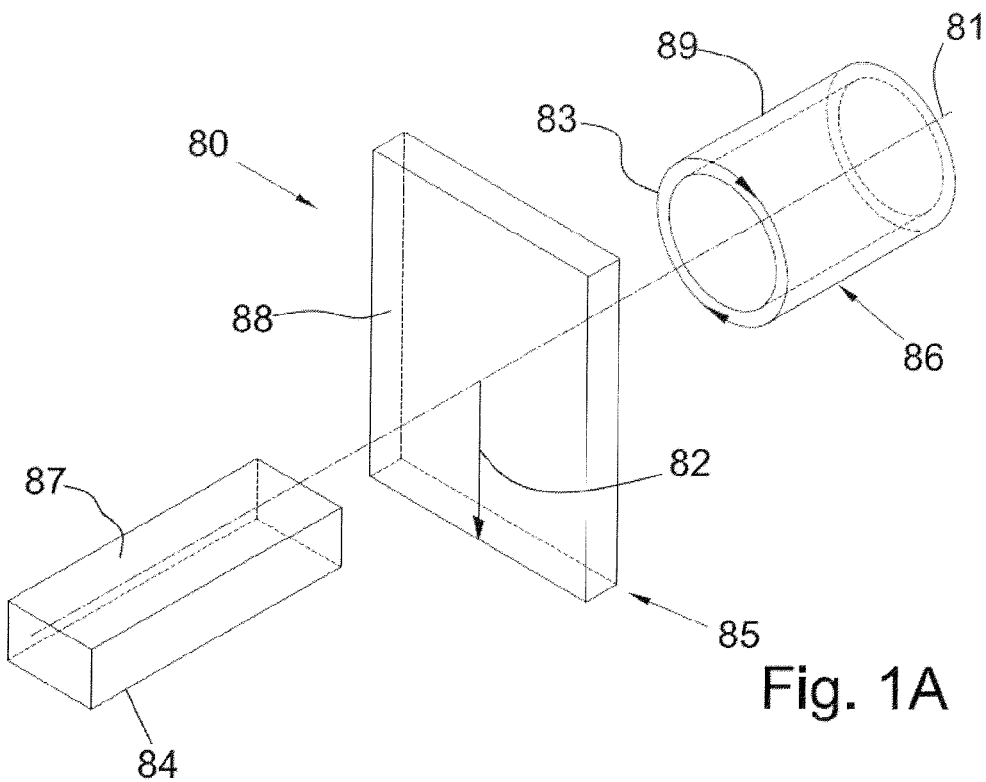
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
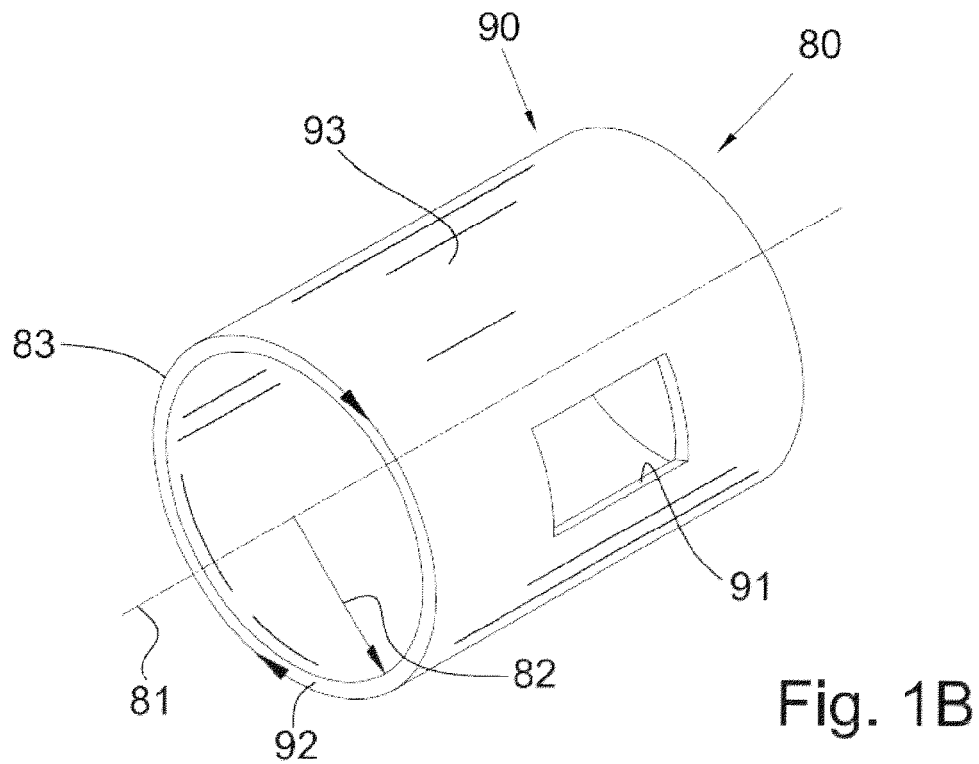
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
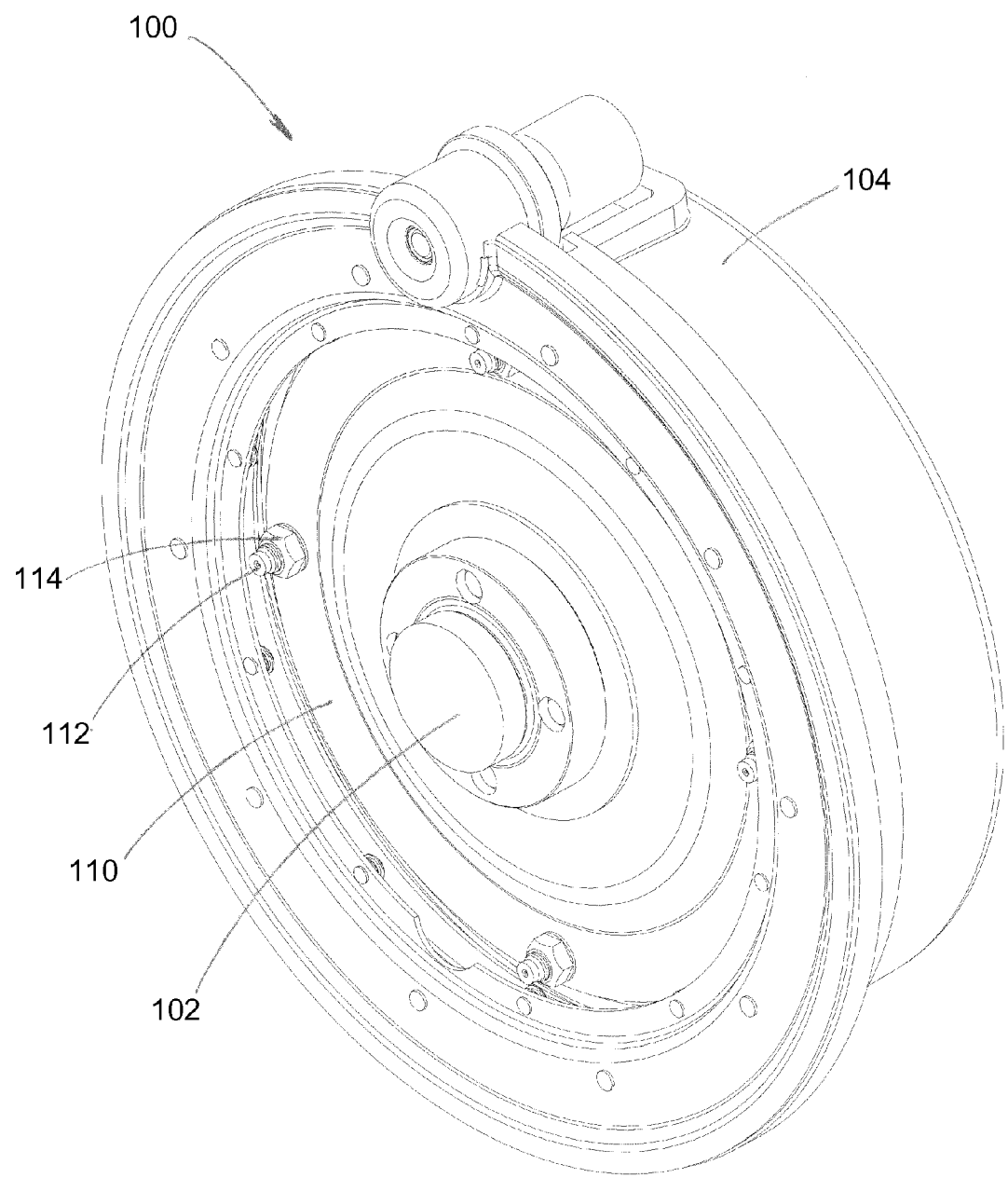
FIG. 2 is a front perspective view of a starting device shown assembled with a crankshaft portion and a transmission bellhousing according to an example aspect.
Figure 3:
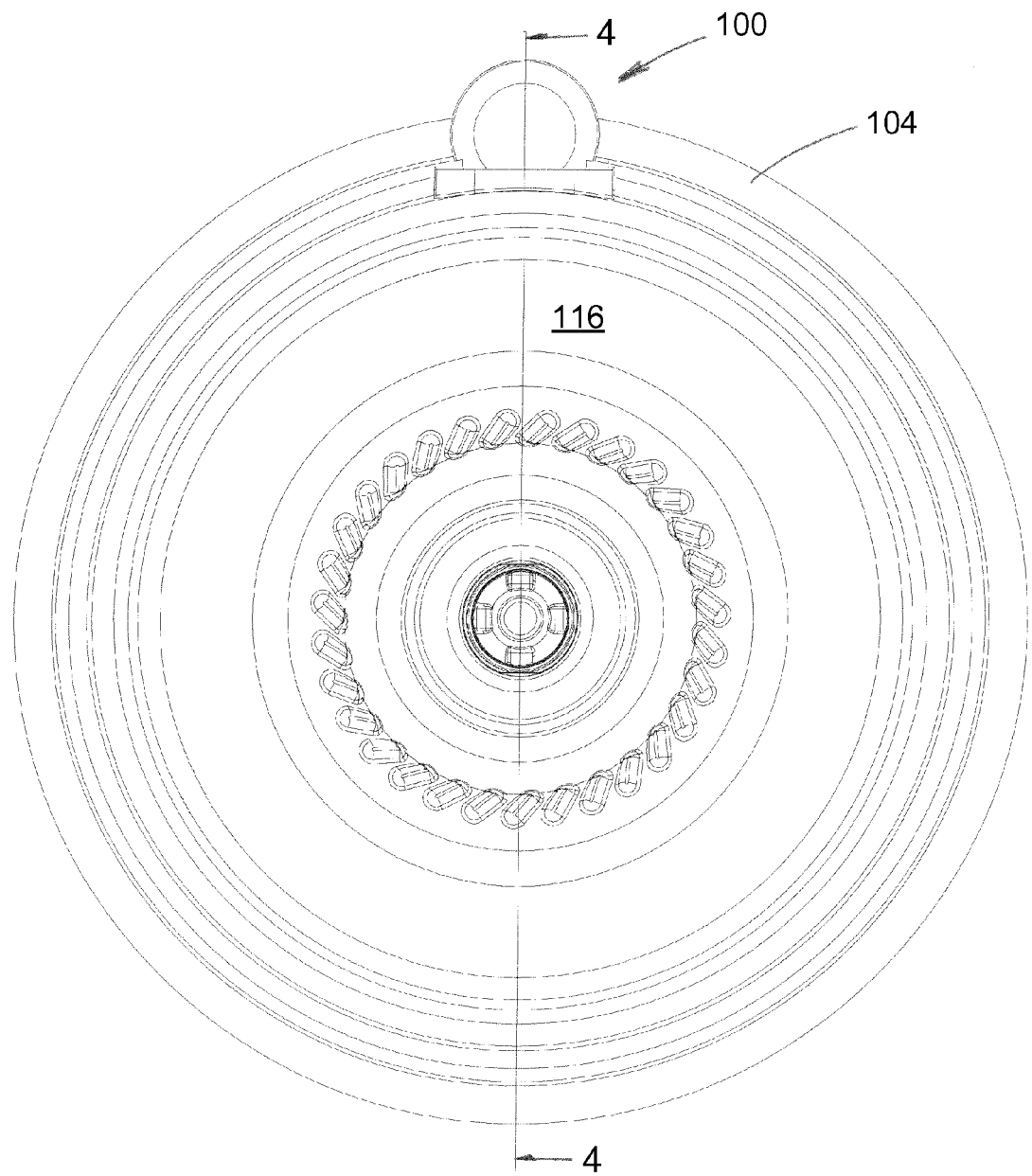
FIG. 3 is a back view of the starting device of FIG. 2.
Figure 4:
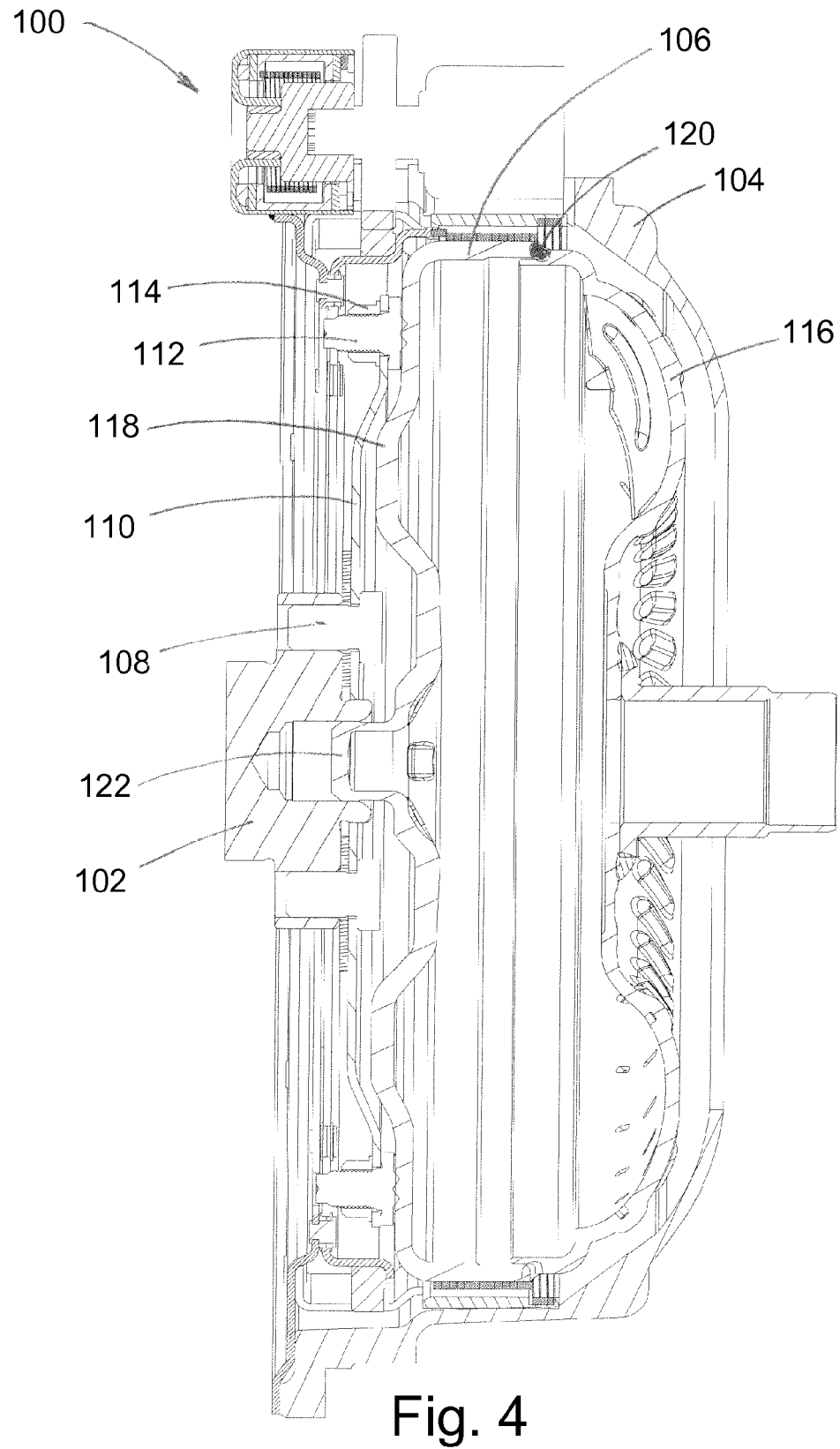
FIG. 4 is a section view of the starting device of FIG. 3 taken generally along line 4-4 in FIG. 3.
Figure 5:
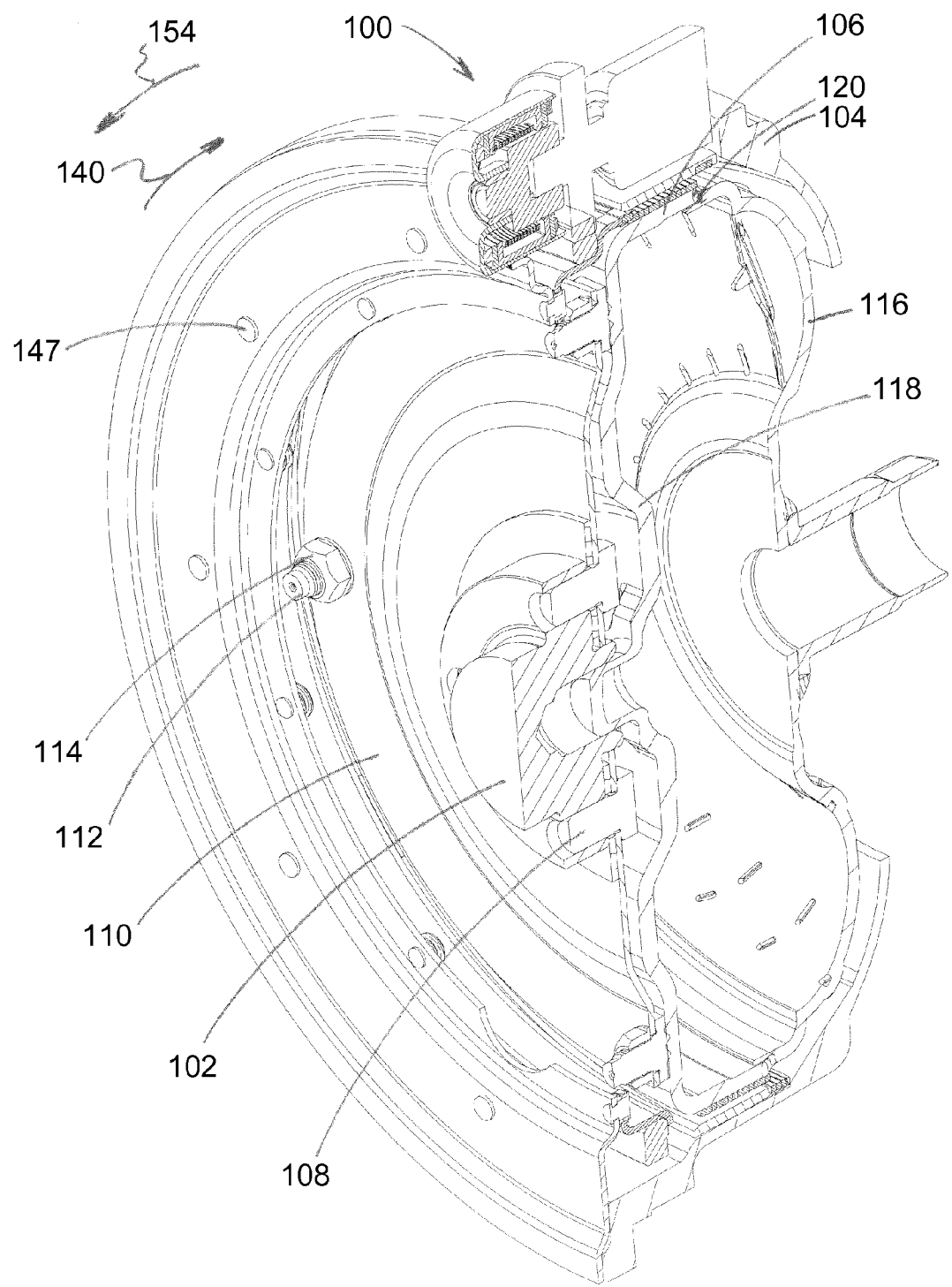
FIG. 5 is a perspective section view of the starting device of FIG. 4.

The following description is made with reference to FIGS. 2-5 FIG. 2 is a front perspective view of starting device 100 shown assembled with crankshaft portion 102 and transmission bellhousing 104 according to an example aspect. FIG. 3 is a back view of the starting device of FIG. 2. FIG. 4 is a section view of the starting device of FIG. 2 taken generally along line 4-4 in FIG. 3. FIG. 5 is a perspective section view of the starting device of FIG. 2.

Crankshaft 102 connects to torque converter shell 106 through bolts 108 and flexplate 110. Converter studs 112 are fixed to the shell by projection welding, and to the flexplate by nuts 114. In another example embodiment (not shown), nuts (not shown) are fixed to the cover and the flexplate is attached by bolting through the flexplate into the nuts. In yet another example embodiment, a drive plate (not shown) is fixed to the cover and the flexplate is attached to the drive plate. Therefore, shell 106 is drivingly engaged with crankshaft 102. Shell 106 comprises impeller shell 116 and cover 118 fixed to shell 116 by weld 120. Cover 118 includes pilot portion 122 for radially centering converter shell 106 relative to crankshaft 102. Although only shell 106 is shown for clarity, internal components such as a turbine, stator, and clutch may be contained within shell 106 as is known in the art.

Figure 6:
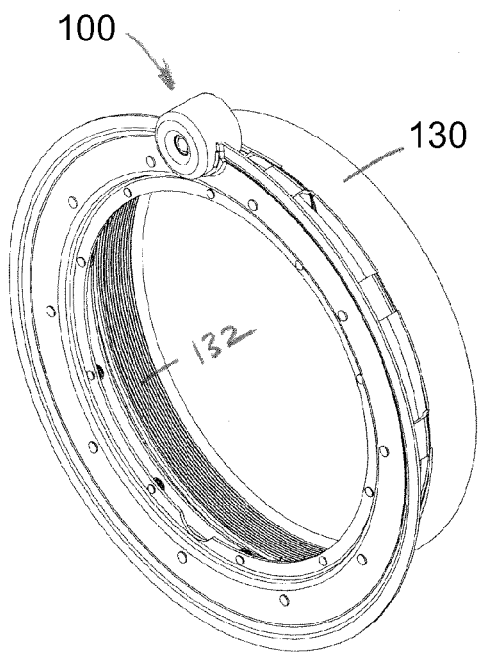
FIG. 6 is a perspective view of the starting device of FIG. 2 shown without the crankshaft and bellhousing for clarity.
Figure 7:
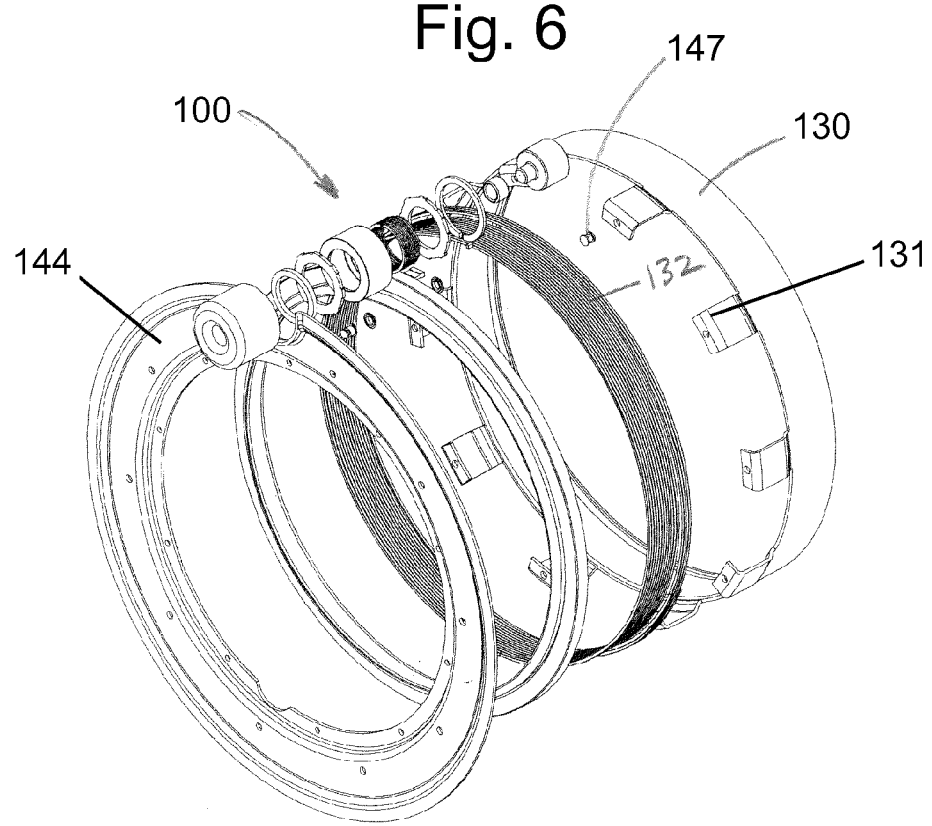
FIG. 7 is an exploded view of the starting device of FIG. 6.
Figure 8:
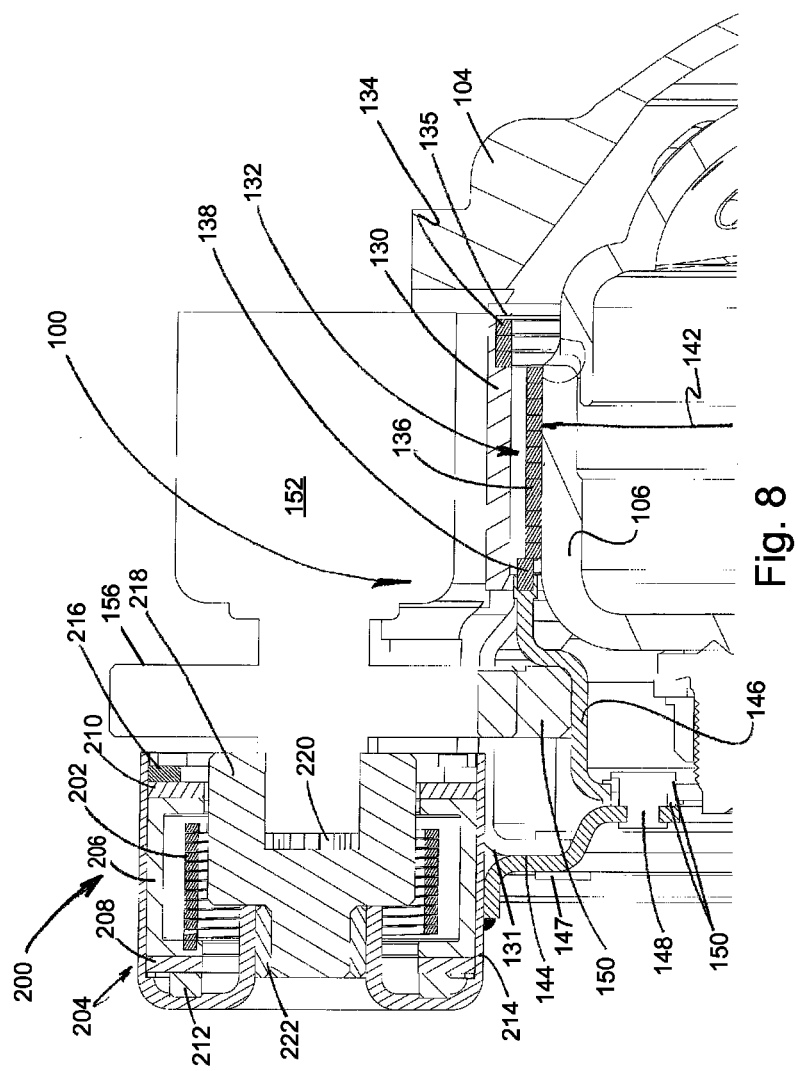
FIG. 8 is a detail view of a top portion of the starting device of FIG. 4.

The following description is made with reference to FIGS. 2-8. FIG. 6 is a perspective view of starting device 100 of FIG. 2 shown without the crankshaft and bellhousing for clarity. FIG. 7 is an exploded view of starting device 100 of FIG. 6. FIG. 8 is a detail view of a top portion of starting device 100 of FIG. 4. Starting device 100 includes spring support ring 130 and coiled clutch, or wrap spring clutch, 132. Ring 130 is fixed to centering plate 144, as described in more detail below. In an example embodiment (not shown), ring 130 is press-fitted into bellhousing 104. In yet another example embodiment (not shown), ring 130 is integral with housing 104.

Spring support ring 130 encircles clutch 132, and is frictionally engaged with friction end or first end 134 of the clutch at circumferential groove 135. Clutch 132 also includes center portion 136 connected to end 134 and arranged for compressive engagement with outer shell 106, and driven end or second end 138 connected to center portion 136 and arranged for rotational displacement in direction 140 (ref. FIG. 5) relative to end 134 to compressively engage the clutch center portion with the shell. That is, end 134 has an increased pitch and is radially compressed when it is inserted into groove 135, such that rotation of end 134 is prevented until the frictional force between end 134 and ring 130 is overcome. Otherwise stated, friction between end 134 and ring 130 resists displacement of end 134 relative to ring 130 so that end 138 may rotate relative to end 134.

Because ends 134 and 138, and portion 136 are connected, and, in some embodiments, are continuous, rotation of end 138 relative to end 134 decreases diameter 142 of center portion 136 to compressively engage shell 106. Otherwise stated, diameter 142 of the center portion of clutch 132 decreases when end 138 is rotationally displaced relative to end 134, and clutch 132 becomes drivingly engaged with shell 106. In the embodiment shown in FIG. 8, a free diameter of end 134 is greater than a free diameter of center portion 132 so that, in a free state, end 134 is frictionally engaged with ring 130 but portion 136 is rotationally free relative to ring 130.

Starting device 100 also includes centering plate 144 and gear support plate 146. Plate 144 is fixed to support ring 130 at rivets 147 and fixed between the engine and bellhousing. Plate 144 may be fixed by bolts (not shown) connecting the engine and transmission or clamped between the engine and transmission when the connecting bolts are installed. Plate 144 provides centering of assembly 100 and prevents rotation of support ring 130 relative to bellhousing 104. Gear support plate 146 is drivingly engaged with clutch end 138 and rotatably connected to centering plate 144 at spacer rivets 148. By rotatably connected, we mean that plate 146 can rotate relative to plate 144, but may be restricted from motion in other directions. Rivets 148 include axially positioning rings, pulleys or wheels, 150 for locating plate 146 with low friction. That is, rivets 148 and rings 150 permit free rotation of plate 146 relative to centering plate 144. In another embodiment (not shown), plate 146 extends radially inward and centers on crankshaft 102 or a portion of the engine housing (not shown). Ring gear 150 is fixed to gear support plate 146. Ring gear 150 is drivingly engaged with a pinion of starter motor 152 such that motor 152 rotates gear 150 to engage clutch 100 with the converter to rotate the vehicle engine as described in more detail below. Gear 150 is in constant mesh with a gear of motor 152.

Device 100 includes return clutch assembly 200 for displacing end 138 in direction 154, opposite direction 140, to disengage clutch 100 from shell 106 as described below. Assembly 200 includes coiled return spring 202 and friction clutch 204. Friction clutch 204 includes load tube 206, friction washers 208 and 210, and resilient element, or wave washer, 212 urging the load tube against washer 210. Housing 214 surrounds assembly 200, and snap ring 216 reacts axial force from wave washer 212. Spring 202 is drivingly engaged with the load tube at a first end, and drivingly engaged with drive hub 218 at a second end. Drive hub 218 is drivingly engaged with the starter motor at spline 220, and supported within housing 214 by bushing 222. Bushing 222 limits friction between housing 214 and hub 218 during rotation of the hub. Reverse rotation of clutch 132 radially expands portion 136 against ring 130, preventing the spring from vibrating or coming out of location when the system is not in use. Ring 130 provides a continuous surface to unwind the wrap spring against.

In some example embodiments, starting device 100 includes return clutch 200 drivingly engaged with driven end or second end 138 of coiled clutch 132. As shown in FIG. 8, drive hub 218 of return clutch 200 is engaged with starter motor spline 220; and pinion 156 of starter motor 152 is engaged with ring gear 150, which is fixed to gear support plate 146. Gear support plate 146 is in turn drivingly engaged with second end 138.

Other example aspects broadly comprise starting device 100 for a vehicle including centering plate 144, a spring support ring 130 fixed to the centering plate, and a gear support plate 146 rotatable relative to the centering plate and arranged for fixing to a torque converter. As shown in FIGS. 6-8, spring support ring 130 is frictionally engaged with friction end or first end 134 of coiled clutch 132 at circumferential groove 135. Center portion 136 of clutch 132 is connected to first end 134 and second end 138. Gear support plate 146 is drivingly engaged with second end 138 and rotatably connected to centering plate 144 at spacer rivets 148. Extension 131 of support ring 130 is connected to centering plate 144 at rivets 147.

Assembly 100 can be a complete, self-contained assembly that is assembled as a unit and installed into the transmission bellhousing. Support ring 130 and plate 144 are fixed together, and provide a mounting point for the other components. Assembly with the transmission takes place after the torque converter is installed, after which the engine and transmission may be installed in the usual manner (i.e., by installing nuts 114 on studs 112 and connecting the transmission bellhousing to the engine housing, fixing plate 144 therebetween). Similarly, installation of starter motor 152 is typical except for a spline, key, or other connection between motor 152 and hub 218.

Figure 9A:
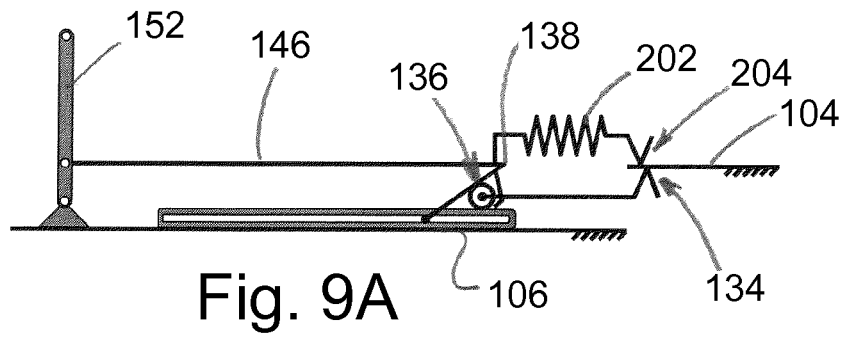
FIGS. 9A-9E are schematic representations of the starting device shown in various operating conditions.
Figure 9B:
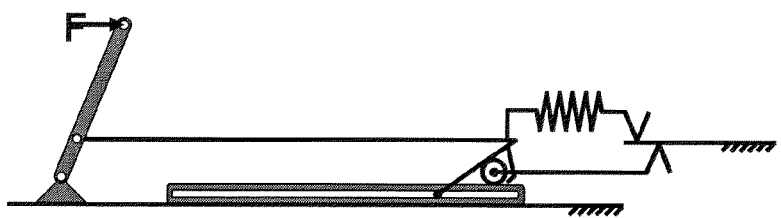
Figure 9C:
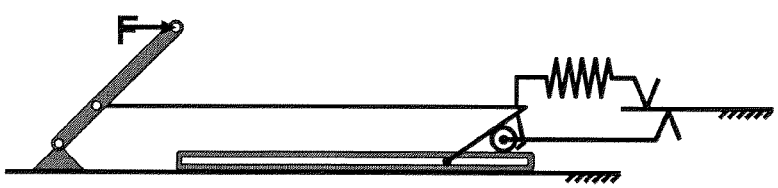
Figure 9D:
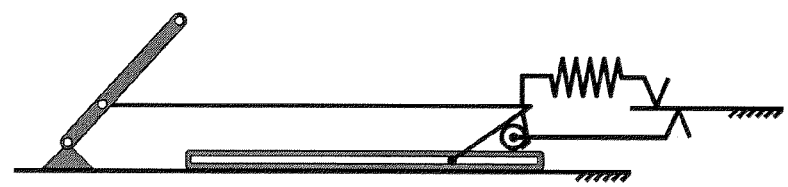
Figure 9E:
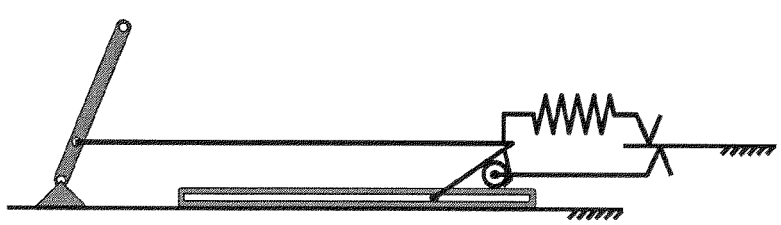

The following description is made with reference to FIGS. 9A-9E. FIGS. 9A-9E are schematic representations of the starting device shown in various operating conditions. FIG. 9A is a schematic representation of the starting device in an initial state. FIG. 9B is a schematic representation of the starting device with a starter drive engaged. FIG. 9C is a schematic representation of the starting device with the starter drive further engaged. FIG. 9D is a schematic representation of the starting device with the drive disengaged and the clutch released. FIG. 9E is a schematic representation of the starting device with the drive disengaged and the system reset.

Operation of starting device 100 will now be described. As shown in FIG. 9A, the device is in a free state such that motor 152 is not exerting force and spring 202 is not compressed. End 134 and friction clutch, or slip clutch, 204 are frictionally engaged with the bellhousing 104. Turning to FIG. 9B, as motor 152 is energized, spring 202 is compressed and portion 136 engages shell 106. It should be noted that friction clutch 204 is designed such that a torque to rotate the slip clutch is slightly greater than a torque to freely rotate motor 152. Further engagement (FIG. 9C) displaces (rotates) shell 106 to start the vehicle. After the vehicle is started, removal of motor force (torque) allows spring 202 to rotate motor 152 in a reverse direction to disengage portion 136, thereby reducing drag on housing 106, until spring 202 is held slightly compressed between the slip clutch and the required torque to freely rotate the motor. Here, the assembly returns to a free state (FIG. 9E). Alternatively, device 100 may be devoid of return clutch 200 and a vehicle motor controller could be adjusted to rotate motor 152 backwards to release clutch 132.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A starting device for a vehicle comprising:
   a spring support ring; and,
   a coiled clutch comprising:
      a first end frictionally engaged with the spring support ring;
      a center portion connected to the first end and arranged for compressive engagement with an outer shell of a torque converter; and,
      a second end connected to the center portion and arranged for rotational displacement in a first direction relative to the first end to compressively engage the center portion with the outer shell.

2. The starting device of claim 1 wherein the spring support ring encircles the coiled clutch.

3. The starting device of claim 2 wherein the spring support ring includes a circumferential groove for receiving the first end.

4. The starting device of claim 3 wherein a free diameter of the first end is greater than a free diameter of the center portion.

5. The starting device of claim 2 wherein the spring support ring is integral with a transmission bellhousing for the vehicle.

6. The starting device of claim 2 wherein the spring support ring is press fitted into a transmission bellhousing for the vehicle.

7. The starting device of claim 2 further comprising a centering plate arranged for fixing between an engine and a transmission, wherein the spring support ring is fixed to the centering plate.

8. The starting device of claim 2 further comprising:
   a centering plate fixed to the spring support ring; and,
   a gear support plate drivingly engaged with the clutch second end and rotatably connected to the centering plate.

9. The starting device of claim 8 further comprising a ring gear fixed to the gear support plate.

10. The starting device of claim 1 further comprising a return clutch drivingly engaged with the second end of the coiled clutch and arranged to displace the second end in a second direction, opposite the first direction, relative to the first end, to release the clutch center portion from the shell.

11. The starting device of claim 10 wherein the return clutch comprises a coiled return spring and a friction clutch.

12. The starting device of claim 11 wherein the friction clutch comprises:
   a load tube circumscribing the return spring;
   at least one friction washer; and,
   a resilient element urging the load tube against the friction washer.

13. The starting device of claim 10 wherein the return clutch is drivingly engaged with a starter motor for the vehicle.

14. A starting device for a vehicle comprising:
   a centering plate;
   a spring support ring fixed to the centering plate;
   a gear support plate rotatable relative to the centering plate and arranged for fixing to a torque converter;
   a ring gear fixed to the ring support plate; and,
   a wrap spring clutch including:
      a first end frictionally engaged with the spring support ring;

a second end fixed to the gear support plate; and,
a center portion arranged for compressive engagement with the torque converter.

15. The starting device of claim 14 wherein the spring support ring is fixedly attached to an engine or a transmission of the vehicle.

16. The starting device of claim 14 further comprising a starter motor fixed to the spring support ring and including a gear drivingly engaged with the ring gear.

17. The starting device of claim 16 further comprising a return clutch including:
a housing;
a drive hub arranged for driving connection with the starter motor;
a load tube frictionally engaged with the housing; and,
a torsion spring with a first end connected to the drive hub and a second end connected to the load tube.

* * * * *